(12) United States Patent
Kaburlasos et al.

(10) Patent No.: US 8,279,213 B2
(45) Date of Patent: Oct. 2, 2012

(54) SYNCHRONIZED MEDIA PROCESSING (75) Inventors: Nikos Kaburlasos, Lincoln, CA (US);
Inder M. Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/655,124

(22) Filed: Dec. 23, 2009

(65) Prior Publication Data

US 2011/0148890 A1 Jun. 23, 2011

(51) Int. Cl.
*G09G 5/00* (2006.01)
*G06F 1/26* (2006.01)
*G06F 1/00* (2006.01)
(52) U.S. Cl. ......... 345/211; 345/213; 713/320; 713/340
(58) Field of Classification Search .......... 345/211–213, 345/502–504; 713/300–340
See application file for complete search history.

(56) References Cited

U.S. PATENT DOCUMENTS

| 2003/0210658 | A1 | 11/2003 | Hernandez et al. |
| 2009/0019185 | A1* | 1/2009 | Kardach et al. ................... 710/5 |
| 2009/0109230 | A1* | 4/2009 | Miller et al. .................. 345/506 |

OTHER PUBLICATIONS

Office Action Received for German Patent Application No. 10 2010 053 298.3, mailed on Feb. 27, 2012, 4 pages of Office Action and 2 pages of English Translation.

* cited by examiner

*Primary Examiner* — Hau Nguyen
(74) *Attorney, Agent, or Firm* — Caven & Aghevli LLC (57) ABSTRACT

An electronic device comprises a central processing unit, a graphics processing unit, and a power control unit comprising logic to develop a predictive model of power states for a central processing unit in the electronic device, and use the predictive model to synchronize activity of a graphics processing unit in the electronic device with periods of activity in the central processing unit. Other embodiments may be described.

25 Claims, 5 Drawing Sheets

SYNCHRONIZED MEDIA PROCESSING

RELATED APPLICATIONS

None.

BACKGROUND

The subject matter described herein relates generally to the field of electronic devices and more particularly to power management techniques in electronic devices having media players.

Some electronic devices such as computing systems may utilize one or more processor core(s) and one or more graphics processor core(s), which may be integrated on a single integrated circuit (IC) or may be on separate ICs coupled by a communication bus. Techniques to coordinate operations of processor core(s) and graphics processor core(s) may find utility.

BRIEF DESCRIPTION OF THE DRAWINGS

The detailed description is described with reference to the accompanying figures.

DETAILED DESCRIPTION

Described herein are exemplary systems and methods to implement synchronized media processing in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
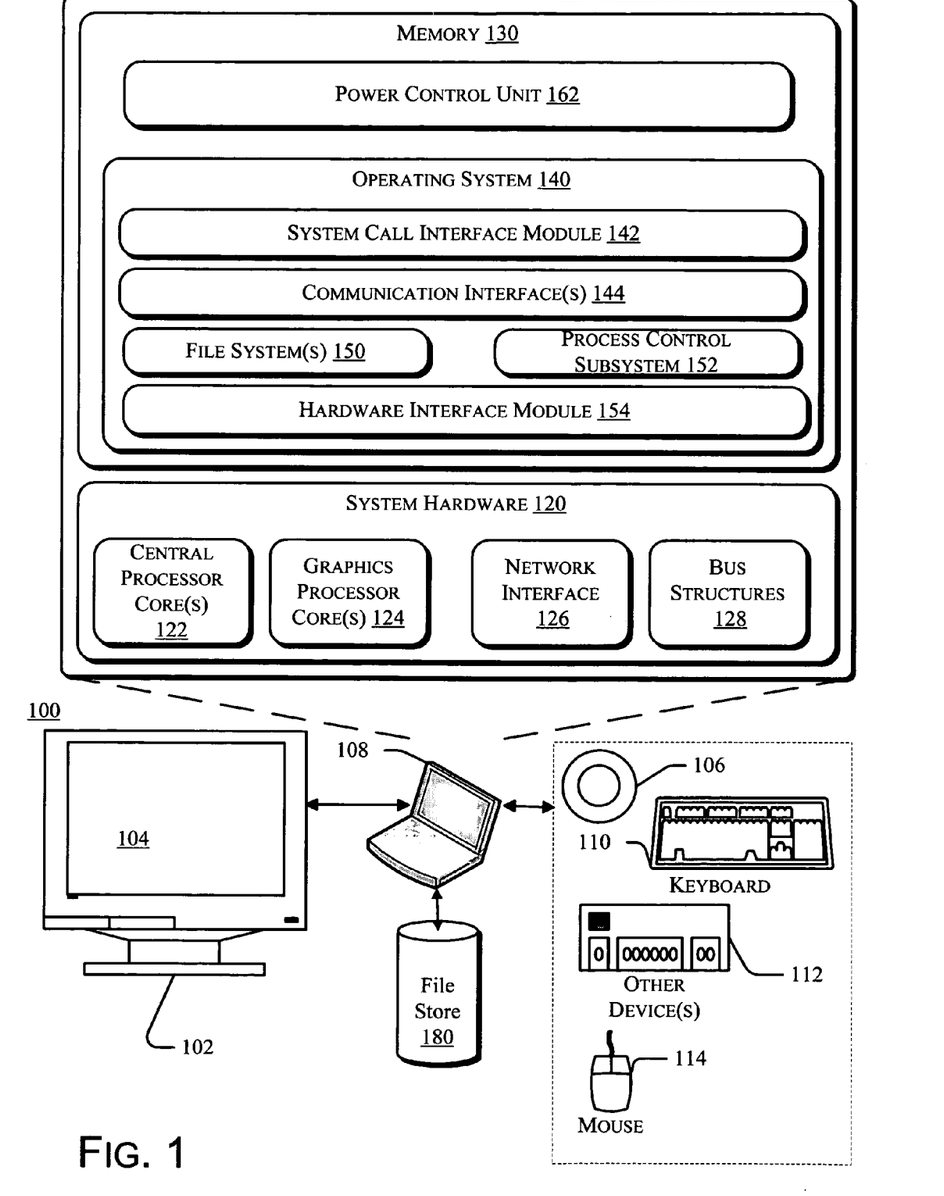
FIG. 1 is a schematic illustration of an electronic device which may be adapted to implement synchronized media processing in accordance with some embodiments.

FIG. 1 is a schematic illustration of an exemplary electronic device which may be adapted to implement synchronized media processing in accordance with some embodiments. In one embodiment, device 100 includes a computing device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any other device that allows the device 100 to receive input from a user.

The computing device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more central processor core(s) 122, one or more graphics processor core(s) 124, one or more network interfaces 126, and one or more bus structures 128. In one embodiment, processor core(s) 122 may be embodied as an Intel Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor core(s) 124 may function as adjunct processors that manage graphics and/or video operations. Graphics processor core(s) 124 may be integrated onto the motherboard of computing device 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In various embodiments, the computing device 108 may be embodied as a personal computer, a laptop computer, a personal digital assistant, a mobile telephone, an entertainment device, or another computing device.

In one embodiment, memory 130 includes a power control unit 162 which facilitates synchronizing power states of graphics processor core(s) 124 with the power states of central processor core(s) 122 in computing device 100. In one embodiment, a power control unit 162 may include logic instructions encoded in a computer-readable medium which, when executed by processor core(s) 122, cause the processor core(s) 122 to implement operations to manage switching between graphics processors 124 in the computing device 100. In other embodiments, the power control unit may be embodied as logic circuitry associated with a low-power controller in the computing device 100.

Figure 2:
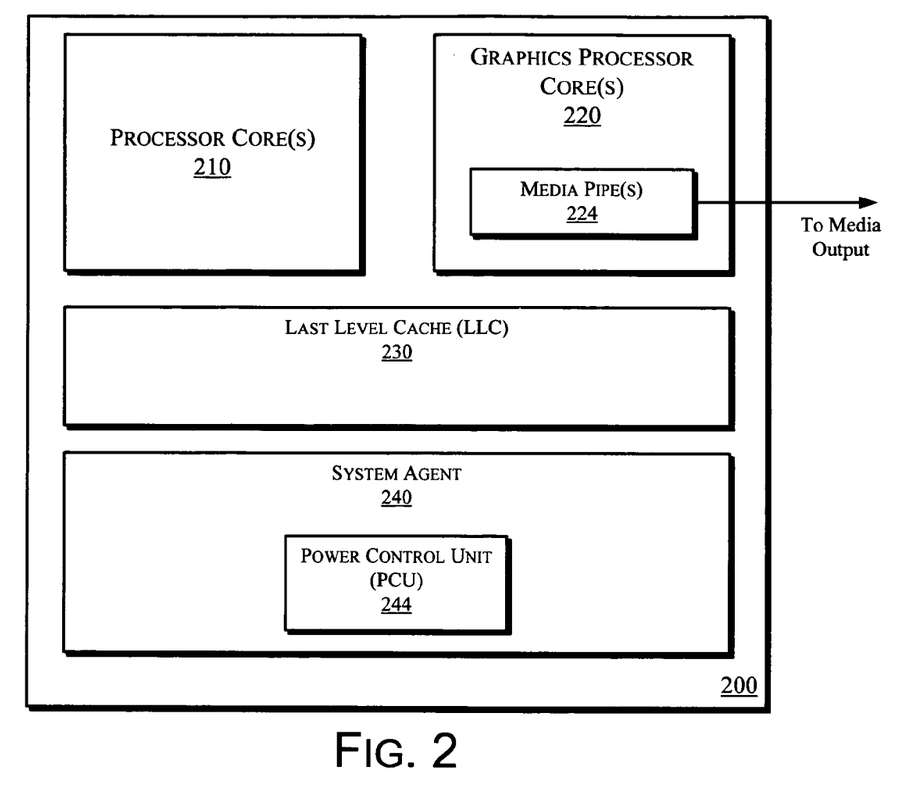
FIG. 2 is a schematic illustration of components of an electronic device adapted to implement synchronized media processing in accordance with some embodiments.

FIG. 2 is a more concise, schematic illustration of components of an electronic device 200 adapted to implement synchronized media processing in accordance with some embodiments. Referring to FIG. 2, in some embodiments electronic device comprises one or more processor cores 210, one or more graphics processor cores 220, a last level cache (LLC) module 230 and a system agent 240. The graphics processor core(s) 220 comprise one or more media pipe(s) 224 which carry graphics output from the processor core(s) 220 to a media output coupled to the electronic device 200. In some embodiments the media pipes 224 may be a coupled to a display such as a liquid crystal display (LCD) by a low-voltage differential signaling (LVDS) multiplexer and may be coupled to a cathode ray tube (CRT) display by a CRT multiplexer. In some embodiments, the discrete graphics processor may be coupled directly to a display device such as, e.g., an analog television (TV) or a High-Definition Multimedia Interface/Digital Video Interactive (HDMI)/(DVI) display port or a DisplayPort interface.

The system agent 240 comprises a power control unit (PCU) 244. The system agent 240 and power control unit implement logic to, among other things, monitor and regulate operations of the processor core(s) 210 and the graphics processor core(s) 220. Aspects of these operations will be explained with reference to FIGS. 3-6.

Figure 5:
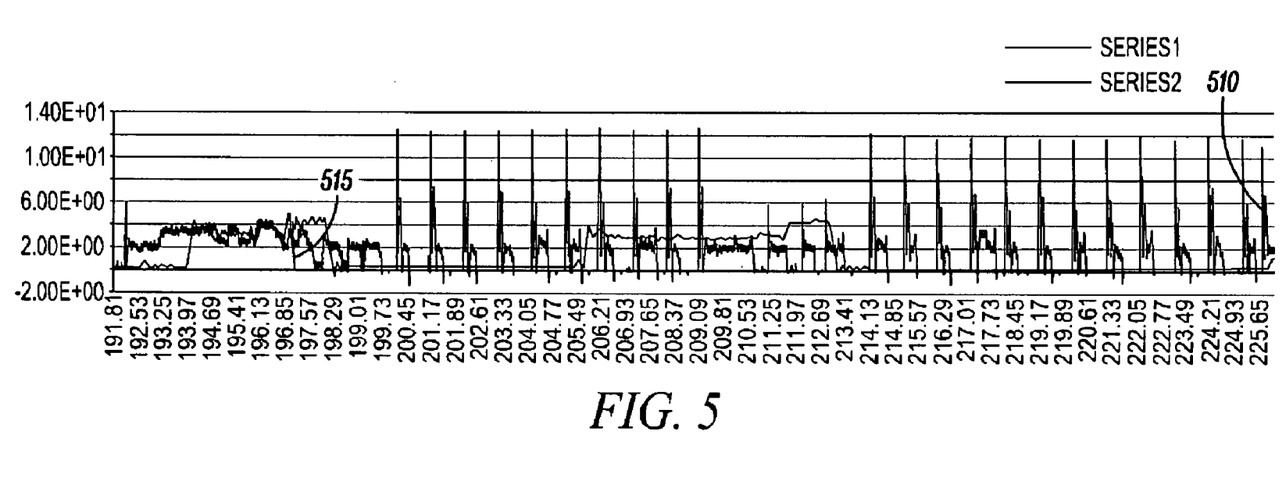
FIG. 5 is a timing diagram illustrating power consumption in an electronic device in the absence of synchronized media processing in accordance with some embodiments.

Referring first to FIG. 5, which is a timing diagram illustrating power consumption in an electronic device in the absence of synchronized media processing in accordance with some embodiments. The timing diagram depicted in FIG. 5 depicts power states for the processor core(s) 210, represented by line 510, and the graphics processor core(s) 220, represented by line 515, in an electronic device embodied as a personal computer system during a video playback operation. The x-axis in FIG. 5 measures time in milliseconds and the y-axis measures power in Watts. Some operating systems (OS) schedule work on the processor core(s) using a periodic 'tick' set, e.g., to once per 1 millisecond (ms) by the media playback application. On every OS tick, the processor core(s) 220 perform one or more tasks related to media playback. For example, the processor cores may fetch more video/audio data from a storage media, execute security software in order to protect the video/audio content fetched in system memory, use a graphics driver to feed more video frames into a video processor(s), decode and post processes audio streams, down-mix audio, render decoded/post-processed video frames on a display, synchronize the video and audio streams, etc. These periodic bursts of activity are reflected by the periodic peaks in the line 510 on FIG. 5. In some embodiments the CPU occasionally has to perform longer tasks and that lead to the longer windows of activity, which can also be seen in FIG. 5.

While the processor core(s)s 210 are executing tasks, the graphics processor core(s) 220 is busy performing hardware decode and post-processing of the video frames that the CPU previously delivered to it. For the purpose of the present disclosure, a salient feature to note from the timing diagram is that the processor core(s) 210 and the graphics processor core(s) 220 operate substantially independently from one another. There is no synchronization between the power states of the processor core(s) 210 and the graphics processor core(s) 220. Thus, referring to FIG. 5, the activity levels of the processor core(s) 210 and graphics processor core(s) 220 do not always overlap. When the processor core(s) 210 and the graphics processor core(s) 220 are integrated into a single IC, the lack of overlap of activity between the processor core(s) 210 and the graphics processor core(s) 220 reduces the amount of time that the integrated circuit can be placed in a low-power consumption state, i.e., a sleep state, since the IC remains powered up when either the processor core(s) 210 or the graphics processor core(s) 220 is active.

As described herein, the power control unit (PCU) 244 of the system agent implements operations which facilitate synchronizing the processor core(s) 210 and the graphics processor core(s) 220 activities during media playback, which increases the amount of time that the integrated circuit can be placed in a low-power consumption state, i.e., a sleep state. Thus, in some embodiments the PCU 244 develops a predictive model of power states for the central processor core(s) 210 in the electronic device and uses the predictive model to synchronize activity of the graphics processing core(s) 220 in the electronic device with periods of activity in the central processor core(s) 210.

Figure 3:
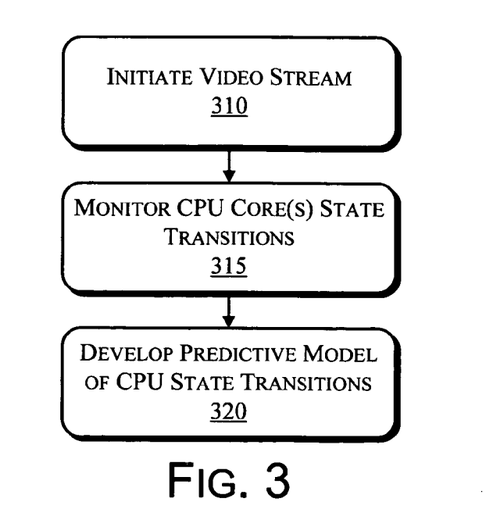
FIG. 3 is a flowchart illustrating operations in a method to implement synchronized media processing in an electronic device, in accordance with some embodiments.

Referring now to FIG. 3, which is a flowchart illustrating operations in a method to implement synchronized media processing in an electronic device, in accordance with some embodiments, at operation 310 a video stream is initiated in the electronic device 200. The video stream may originate from a media source stored on a computer readable medium. For example, the video stream may originate from a video stored on a digital video disk (DVD) or on a magnetic medium such as a hard disk drive, or may be streamed over an electronic communication network.

At operation 315 the PCU 244 monitors state transitions for the central processor core(s) 210 of the electronic device 200 and identifies repeating patterns of activity. By way of example, in an electronic device such as a computer system which implements a power management system such as the Advanced Configuration and Power Interface (ACPI) specification the PCU 244 may monitor when the central processor core(s) 210 of the electronic device 200 transition from a low-power sleep state, e.g., a C2 or higher state, to an operating state, e.g., a C1 or C0 state.

At operation 320 the PCU 244 develops a predictive model of state transitions for the central processor core(s) 210 of the electronic device 200 during video playback. By way of example, referring back to FIG. 5, the PCU 244 may develop a predictive model which notes that the central processor core(s) 210 of the electronic device 200 will change from a low-power sleep state to an operating state every 1 millisecond and will remain in an operating state for approximately 300 microseconds, whereupon it transitions back to a low-power state. One skilled in the art will recognize that in other embodiments the central processor core(s) 210 of the electronic device 200 could change states on a different schedule, and the predictive model would accommodate that changed schedule.

Figure 4:
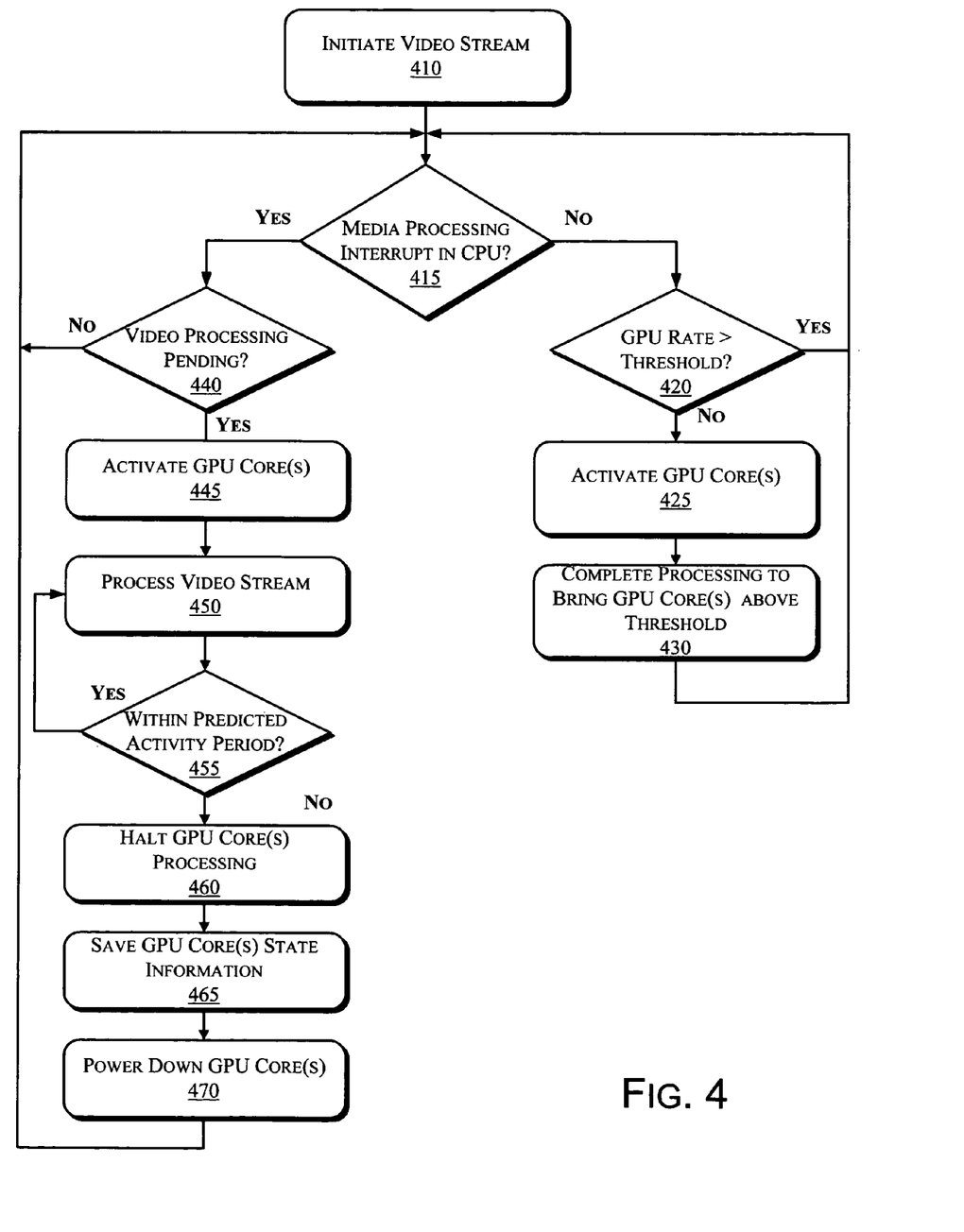
FIG. 4 is a flowchart illustrating operations in a method to implement synchronized media processing in an electronic device, in accordance with some embodiments.

The predictive model developed in operation 320 may then be used to facilitate synchronizing activity of the graphics processing core(s) 220 in the electronic device with periods of activity in the central processor core(s) 210. FIG. 4 is a flowchart illustrating operations in a method to implement synchronized media processing in an electronic device. In some embodiments some operations of FIG. 4 may be implemented by the PCU 244.

Referring now to FIG. 4, at operation 410 a video stream may be initiated in the electronic device, e.g., by playing a video stored on a computer readable medium or accessible via a communication network. Media processing is typically done by means of periodic interrupts that the media application is issuing to the central processing core(s) 210, in order to schedule the processing of the next portion of the video and/or audio streams. At operation 415 it is determined whether a media processing interrupt was received the central processor core(s) 210. If a media processing interrupt was not received, then the PCU 244 suppresses the activity of the graphics processor core(s) 220, provided the graphics processor core(s) 220 are processing the video stream sufficiently fast to continue presentation. Thus, at operation 420 the PCU 244 determines whether the processing rate of the graphics processor core(s) 220 has fallen beneath a threshold required to maintain continued presentation of the video stream. One skilled in the art will recognize that this threshold will vary depending upon, e.g., the processing speed of the particular graphics processor core(s) 220 and associated hardware and the video stream content.

If, at operation 420, the processing rate of the graphics processor core(s) 220 remains above the threshold for the particular electronic device 200, then the PCU 244 can suppress the activity of the graphics processor core(s) 220, thereby allowing the entire integrated circuit to remain in a low-power state. Thus, if at operation 420 the processing rate of the graphics processor core(s) 220 remains above the threshold for the particular electronic device 200 then control can pass back to operation 415 and the PCU 244 can continue monitoring the activity of the central processor core(s) 210.

By contrast, if at operation 420 the processing rate of the graphics processor core(s) 220 is below the threshold for the particular electronic device 200, then the PCU 244 can activate the graphics processor core(s) 220 without regard to the status of the central processor core(s) 210 to allow the graphics processor core(s) 220 to process enough of the video stream to assure continued presentation of the video stream on the device 200. Thus, if at operation 420 the processing rate of the graphics processor core(s) 220 falls below the threshold for the particular electronic device 200 then control can pass back to operation 425 and the PCU 244 can activate the graphics processor core(s) 220 of the device and have it process enough of the video stream to allow the GPU rate to once again exceed the minimum GPU rate threshold (operation 430), so as to not affect the presentation of video frames. In some embodiments the video stream data processed by the graphics processor core(s) 220 may be buffered in a memory location to wait for the central processor core(s) 210 to change to an active state.

Referring back to operation 415, if the central processor core(s) 210 has received a media interrupt, then the PCU 244 uses the predictive model developed in the operations depicted in FIG. 3 to synchronize the activity of the graphics processor core(s) 220 with the predicted activity of the central processor core(s) 210. Thus, if at operation 440 there is no video processing pending, then control passes back to operation 415. By contrast, if at operation 440 there is 440 there is video processing pending, then control passes to operation 445 and the graphics processor core(s) 220 are activated and the video stream is processed (operation 450).

If, at operation 455, the system is still within a predicted period of activity for the central processor core(s) 210 then control passes back to operation 450 and processing continues. By contrast, if at operation 455 the central processor core(s) 210 are not within a predicted activity period determined by the model developed in FIG. 3, then control passes to operation 460 and the PCU 244 halts the activity of the graphics processor core(s) 220. At operation 465 state information associated with the graphics processor core(s) 220 may be stored in a suitable memory location, e.g. a volatile or non-volatile memory module associated with the device 200. This saved state will allow the graphics processor core(s) 220 to resume their operation from the point where they left off, next time they are become active again. At operation 470 the PCU 244 powers the graphics processor core(s) 220 into a low power state, e.g., a sleep state. Control then passes back to operation 415.

Figure 6:
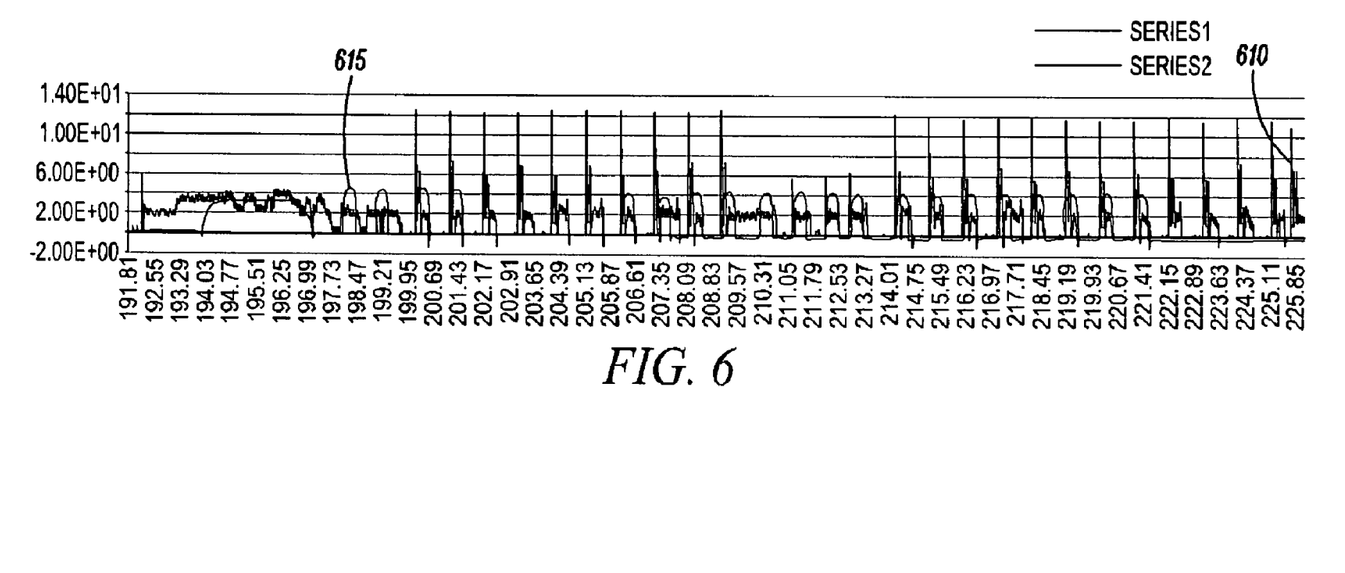
FIG. 6 is a timing diagram illustrating power consumption in an electronic device which implements synchronized media processing in accordance with some embodiments.

Thus, the operations of FIG. 4 enable the PCU 244 to implement a process which uses the predictive model developed in operation 320 to facilitate synchronizing activity of the graphics processing core(s) 220 in the electronic device with periods of activity in the central processor core(s) 210. FIG. 6 is a timing diagram illustrating power consumption in an electronic device which implements synchronized media processing in accordance with some embodiments. The timing diagram depicted in FIG. 6 depicts power states for the processor core(s) 210, represented by line 610, and the graphics processor core(s) 220, represented by line 615, in an electronic device embodied as a personal computer system during a video playback operation. The activity of both the central processor cores (s) 210 and graphics processor core(s) 220 in FIG. 6 is similar to those in FIG. 5, except the central processor and graphics processor core(s) operate in a synchronized fashion in FIG. 6. As evidenced in FIG. 6, the PCU 244 imposes a synchronization of the power states of the graphics processing core(s) 220 in the electronic device with periods of activity in the central processor core(s) 210. As stated earlier, this synchronization allows the IC which encloses both the central processing core(s) and the graphics core(s) to enter deep sleep states for longer periods of times and ultimately it translates to power savings.

Figure 7:
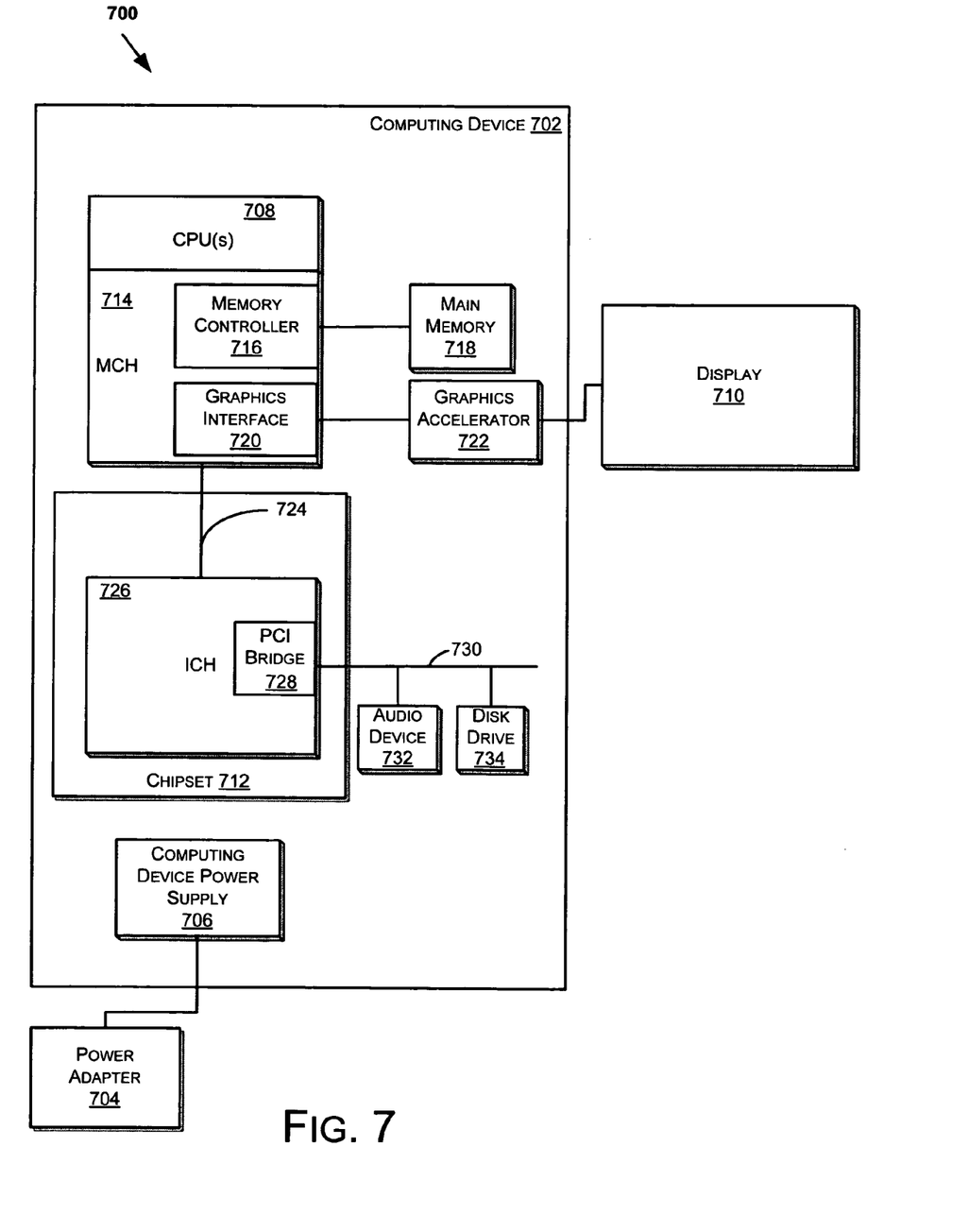
FIG. 7 is a schematic illustration of a computing system which may be adapted to implement switchable graphics processors, according to an embodiment.

FIG. 7 is a schematic illustration of a computing system which may be adapted to implement synchronized media processing, according to an embodiment. The computer system 700 includes a computing device 702 and a power adapter 704 (e.g., to supply electrical power to the computing device 702). The computing device 702 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 702 (e.g., through a computing device power supply 706) from one or more of the following sources: one or more battery packs, an alternating current (AC) outlet (e.g., through a transformer and/or adaptor such as a power adapter 704), automotive power supplies, airplane power supplies, and the like. In some embodiments, the power adapter 704 may transform the power supply source output (e.g., the AC outlet voltage of about 110 VAC to 240 VAC) to a direct current (DC) voltage ranging between about 7 VDC to 12.6 VDC. Accordingly, the power adapter 704 may be an AC/DC adapter.

The computing device 702 may also include one or more central processing unit(s) (CPUs) 708. In some embodiments, the CPU 408 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 712 may be coupled to, or integrated with, CPU 708. The chipset 712 may include a memory control hub (MCH) 714. The MCH 714 may include a memory controller 716 that is coupled to a main system memory 718. The main system memory 718 stores data and sequences of instructions that are executed by the CPU 708, or any other device included in the system 700. In some embodiments, the main system memory 718 includes random access memory (RAM); however, the main system memory 718 may be implemented using other memory types such as dynamic RAM (DRAM), synchronous DRAM (SDRAM), and the like. Additional devices may also be coupled to the bus 710, such as multiple CPUs and/or multiple system memories.

The MCH 714 may also include a graphics interface 720 coupled to a graphics accelerator 722. In some embodiments, the graphics interface 720 is coupled to the graphics accelerator 722 via an accelerated graphics port (AGP). In some embodiments, a display (such as a flat panel display) 740 may be coupled to the graphics interface 720 through, for example, a signal converter that translates a digital representation of an image stored in a storage device such as video memory or system memory into display signals that are interpreted and displayed by the display. The display 740 signals produced by the display device may pass through various control devices before being interpreted by and subsequently displayed on the display.

A hub interface 724 couples the MCH 714 to an platform control hub (PCH) 726. The PCH 726 provides an interface to input/output (I/O) devices coupled to the computer system 700. The PCH 726 may be coupled to a peripheral component interconnect (PCI) bus. Hence, the PCH 726 includes a PCI bridge 728 that provides an interface to a PCI bus 730. The PCI bridge 728 provides a data path between the CPU 708 and peripheral devices. Additionally, other types of I/O interconnect topologies may be utilized such as the PCI Express™ architecture, available through Intel® Corporation of Santa Clara, Calif.

The PCI bus 730 may be coupled to an audio device 732 and one or more disk drive(s) 734. Other devices may be coupled to the PCI bus 730. In addition, the CPU 708 and the MCH 714 may be combined to form a single chip. Furthermore, the graphics accelerator 722 may be included within the MCH 714 in other embodiments.

Additionally, other peripherals coupled to the PCH 726 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 702 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to process media streams in an electronic device, comprising:
   developing, in a power control unit in the electronic device, a predictive model of power states for a first processing unit in the electronic device; and
   using the predictive model to synchronize activity of a second processing unit in the electronic device with periods of activity in the first processing unit, such that a processing activity of the second processing unit is suppressed in time periods in which the first processing unit is in a low power state, while maintaining a processing task executing on the second processing unit a processing rate that exceeds a predetermined threshold.

2. The method of claim 1, wherein developing, in a power control unit in the electronic device, a predictive model of power states for a first processing unit comprises:
   initiating a video stream playback in the electronic device;
   monitoring, in the power control unit, state transitions in the first processing unit during the video stream playback; and
   using timing information associated with the state transitions to develop the predictive model of power states for the first processing unit.

3. The method of claim 1, wherein using the predictive model to synchronize activity of a graphics processing unit in the electronic device with periods of activity in the first processing unit comprises:
   halting execution of the second processing unit during processing of a graphics frame; and
   saving state information associated with the graphics frame.

4. The method of claim 3, further comprising:
   monitoring, in the power control unit, a video processing rate of the second processing unit; and
   activating the second processing unit when the video processing rate falls below a predetermined threshold.

5. The method of claim 1, wherein using the predictive model to synchronize activity of a graphics processing unit in the electronic device with periods of activity in the first processing unit further comprises:
   activating the graphics processing unit when the first processing unit transitions from a low power state to an active state.

6. The method of claim 5, further comprising:
   processing the video stream on the second processing unit; and
   halting execution of the second processing unit when the predictive model indicates that the first processing unit is entering a low-power state.

7. The method of claim 1, wherein:
   the first processing unit is activated on a periodic basis by a tick from an operating system which executes on the electronic device.

8. An apparatus, comprising logic to:
   develop a predictive model of power states for a central processing unit;
   use the predictive model to synchronize activity of a graphics processing unit in the electronic device with periods of activity in the central processing unit, such that a processing activity of the graphics processing unit is suppressed in time periods in which the central processing unit is in a low power state, while maintaining a processing task executing on the second processing unit a processing rate that exceeds a predetermined threshold.

9. The apparatus of claim 8, further comprising logic to:
   initiate a video stream playback in the electronic device;
   monitor, in the power control unit, state transitions in the central processing unit during the video stream playback; and
   use timing information associated with the state transitions to develop the predictive model of power states for the central processing unit.

10. The apparatus of claim 8, further comprising logic to:
    halt execution of the graphics processing unit during processing of a graphics frame; and
    save state information associated with the graphics frame.

11. The apparatus of claim 8, further comprising logic to:
    activate the graphics processing unit when the central processing unit transitions from a low power state to an active state.

12. The apparatus of claim 8, further comprising logic to:
    process the video stream on the graphics processing unit; and
    halt execution of the graphics processing unit when the predictive model indicates that the central processing unit is entering a low-power state.

13. The apparatus of claim 8, further comprising logic to:
    monitor, in the power control unit, a video processing rate of the graphics processing unit; and
    activate the graphics processing unit when the video processing rate falls below a predetermined threshold.

14. The apparatus of claim 8, wherein:
    the central processing unit is activated on a periodic basis by a tick from an operating system.

15. A computer program product comprising logic instructions stored on a computer readable medium which, when executed by a processing device, configure the processor to process media streams in an electronic device by performing operations, comprising:
    developing, in a power control unit in the electronic device, a predictive model of power states for a central processing unit in the electronic device; and
    using the predictive model to synchronize activity of a graphics processing unit in the electronic device with periods of activity in the central processing unit, such that a processing activity of the graphics processing unit is suppressed in time periods in which the central processing unit is in a low power state, while maintaining a processing task executing on the second processing unit a processing rate that exceeds a predetermined threshold.

16. The computer program product of claim 15, wherein developing, in a power control unit in the electronic device, a predictive model of power states for a central processing unit comprises:
    initiating a video stream playback in the electronic device;
    monitoring, in the power control unit, state transitions in the central processing unit during the video stream playback; and
    using timing information associated with the state transitions to develop the predictive model of power states for the central processing unit.

17. The computer program product of claim 15, wherein using the predictive model to synchronize activity of a graphics processing unit in the electronic device with periods of activity in the central processing unit comprises:
    halting execution of the graphics processing unit during processing of a graphics frame; and
    saving state information associated with the graphics frame.

18. The computer program product of claim 17, wherein using the predictive model to synchronize activity of a graphics processing unit in the electronic device with periods of activity in the central processing unit further comprises:
  activating the graphics processing unit when the central processing unit transitions from a low power state to an active state.

19. The computer program product of claim 18, further comprising:
  processing the video stream on the graphics processing unit; and
  halting execution of the graphics processing unit when the predictive model indicates that the central processing unit is entering a low-power state.

20. The computer program product of claim 17, further comprising:
  monitoring, in the power control unit, a video processing rate of the graphics processing unit; and
  activating the graphics processing unit when the video processing rate falls below a predetermined threshold.

21. The computer program product of claim 15, wherein:
  the central processing unit is activated on a periodic basis by a tick from an operating system which executes on the electronic device.

22. An electronic device, comprising:
  a central processing unit;
  a graphics processing unit;
  a power control unit comprising logic to:
    develop a predictive model of power states for a central processing unit in the electronic device;
    use the predictive model to synchronize activity of a graphics processing unit in the electronic device with periods of activity in the central processing unit, such that a processing activity of the graphics processing unit is suppressed in time periods in which the central processing unit is in a low power state, while maintaining a processing task executing on the second processing unit a processing rate that exceeds a predetermined threshold.

23. The electronic device of claim 8, wherein the power control unit further comprises logic to:
  initiate a video stream playback in the electronic device;
  monitor, in the power control unit, state transitions in the central processing unit during the video stream playback; and
  use timing information associated with the state transitions to develop the predictive model of power states for the central processing unit.

24. The electronic device of claim 8, wherein the power control unit further comprises logic to:
  halt execution of the graphics processing unit during processing of a graphics frame; and
  save state information associated with the graphics frame.

25. The electronic device of claim 8, wherein the power control unit further comprises logic to:
  activate the graphics processing unit when the central processing unit transitions from a low power state to an active state.

* * * * *